United States Patent [19]

van de Leemput

[11] 4,146,695

[45] Mar. 27, 1979

[54] CHROMIUM-BASED CATALYSTS FOR THE POLYMERIZATION OF 1-ALKENES

[75] Inventor: Lambertus J. M. A. van de Leemput, Geleen, Netherlands

[73] Assignee: Stamicarbon, B.V., Geleen, Netherlands

[21] Appl. No.: 799,655

[22] Filed: May 23, 1977

[30] Foreign Application Priority Data

May 24, 1976 [NL] Netherlands .......................... 7605535

[51] Int. Cl.² .......................... C08F 4/24; C08F 4/62; C08F 4/78; C08F 10/00

[52] U.S. Cl. .................... 526/105; 252/430; 252/431 R; 526/106; 526/124; 526/129; 526/132; 526/134; 526/151; 526/153; 526/156; 526/159

[58] Field of Search .............. 526/105, 106, 124, 129, 526/132, 134, 151, 153, 156, 169; 252/430, 431 R

[56] References Cited

U.S. PATENT DOCUMENTS

| | | | |
|---|---|---|---|
| 3,901,863 | 8/1975 | Berger et al. | 526/132 |
| 3,947,433 | 3/1976 | Witt | 526/105 |
| 3,953,413 | 4/1976 | Hwang et al. | 526/96 |
| 3,959,178 | 5/1976 | Hogan | 526/105 |
| 3,984,351 | 10/1976 | Rekens et al. | 526/132 |

FOREIGN PATENT DOCUMENTS 681141 3/1964 Canada .................................... 526/134

*Primary Examiner*—Alan Holler
*Attorney, Agent, or Firm*—Cushman, Darby & Cushman

[57] ABSTRACT

The invention is directed to new catalysts consisting of a chromium compound and an organometal compound of an element of Group II or III of the periodic system on a carrier, the process for preparing the catalyst and its use in polymerizing 1-alkenes containing 2 to 8 carbon atoms, optionally admixed with at most 10 mole% of at least one other 1-alkene of 2 to 8 carbon atoms.

21 Claims, No Drawings

CHROMIUM-BASED CATALYSTS FOR THE POLYMERIZATION OF 1-ALKENES

BACKGROUND OF THE INVENTION

U.S. Pat. No. 3,704,287 describes polymerization catalysts formed by activating a chromate ester-supported on a carrier with an aluminum, magnesium or gallium organometallic compound. Prior to U.S. Pat. No. 3,704,287, U.S. Pat. Nos. 2,825,721 and 2,951,816 showed the use of chromium oxide, containing some hexavalent chromium, (at least in the early stages of polymerization) on a carrier to catalyze the polymerizations of 1-alkenes; in those systems, catalytic activity was optimized by heating the catalyst in a non-reducing, preferably oxidizing, atmosphere. U.S. Pat. No. 2,824,089 and Canadian Pat. No. 624,913 and teach polymerizing 1-alkenes in the presence of a catalyst consisting of a supported oxide of a metal of Group $VI^b$ of the periodic system, e.g. chromium oxide, and an organometal compound of an element of Group III of the Periodic System, e.g. boron or aluminum. Further, combinations of chromium compounds with compounds of other elements have been employed, for instance, phosphorus oxides as reflected by Canadian Pat. No. 619,801 or catalysts based on a chromium compound not being an oxide as reflected by U.K. Pat. No. 1430463 and German Offenlegungsschrift No. 2,307,147, which describe use of catalysts produced by activating chromium (III) acetyl acetonate supported on silica with an aluminum trialkyl.

It is an object of the invention to provide a process for the polymerization of 1-alkenes in the presence of a supported chromium compound serving as an active catalyst which gives very high yields of a polymer which contains only very minor quantities of catalyst residues.

It is a further object of the invention to provide a process for the polymerization of ethylene. Another object of the invention is to provide a process for the preparation of polyethylene possessing good mechanical and physical properties by polymerizing ethylene containing minor quantities of less than 5 mole% of propylene and/or butylene.

DESCRIPTION OF THE INVENTION

The invention is directed to new chromium containing catalysts, the process for their preparation and the use of the catalysts in polymerizing 1-alkenes of 2 to 8 carbon atoms.

The catalysts may be simply described as a reaction product, of a chromium complex of a 1,3-diketo compound and an organometallic compound of a metal of Group II and III at least one bond of said metal being to a carbon atom of a hydrocarbyl group, e.g. an alkyl of 1 to 20 carbon atoms, supported on a carrier which supported reaction product is further treated, and thus includes, an organometallic compound of an element of Group II or III of the periodic system. The nature of the catalyst may be more easily understood by reference to the process for its preparation.

The process for preparing the catalyst of the invention comprises (a) reacting (1) a 1,3-diketo compound having the formula $Cr(OCR_1\!=\!C(H)\ R_2\ CR_3O)_3$ wherein each of $R_1$ and $R_3$ is an alkyl of 1 to 20 carbon atoms and $R_2$ is hydrogen or an alkyl of 1 to 20 carbon atoms with (2) an organometallic compound of an element of Group II or III of the periodic system, in which at least one hydrocarbon group, e.g. alkyl, of 1 to 20 carbon atoms is bonded through a carbon atom thereof to said element to form a reaction product; (b) depositing the reaction product of (a) on a carrier; (c) heating the reaction product supported on a carrier in a non-reducing atmosphere at a temperature ranging from 200° to 1200° C.; and combining the heat treated product of (c) with an organometallic compound of an element of Group II or III of the periodic system.

The chromium compounds, used in step (a) above, are chromium complexes of 1,3-diketo compounds of the general formula

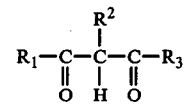

where $R_1$, $R_2$ and $R_3$ have the aforementioned meaning, and thus the 1,3 diketo compounds include such compounds as acetyl acetone, hexane-2,4-dione, heptane-2,4-dione; octane-2,4-dione, octane-3,5-dione and homologues of the said compounds, in which $R_1$ is an alkyl group of 1 to 10 carbon atoms. Preferably, acetyl acetone is used as the diketo compound, and the chromium (III) acetyl acetonate thereof is the chromium compound.

In step (a), said chromium complex is reacted with an organometal compound of a metal of Group II or III of the periodic system, such as beryllium, magnesium, boron, aluminum or gallium. Preferred hydrocarbyl groups in these compounds are alkyl groups with 1–20 carbon atoms. Particularly suited compounds are the aluminum trialkyls and magnesium dialkyls.

The alkyl groups in the magnesium dialkyls should preferably contain 4–12 carbon atoms. Suitable organo magnesium compounds are diethyl magnesium, dipropyl magnesium, di-iso propyl magnesium, diamylmagnesium, dihexyl magnesium, dioctyl magnesium, didecyl magnesium, didodecyl magnesium, as well as dicycloalkyl magnesium compounds with identical or different cycloalkyl groups of 3–12 carbon atoms, and, preferably, 5 or 6 carbon atoms. Dibutyl- or diisobutylmagnesium are preferred. An alkyl and a cycloalkyl group may be bonded to magnesium. Although alkyl- or cycloalkyl magnesium compounds are preferred, magnesium aryls may also be used, notably diphenyl magnesium, as well as ditolyl and dixylyl magnesium. The diaryl magnesium compounds are insoluble, or not very soluble, in aliphatic hydrocarbons and, for that reason, are dissolved in aromatic hydrocarbons. The organo magnesium compounds may be prepared in any known manner (see e.g. Organometallic Compounds; Vol. 1; G. E. Coates; M. L. H. Green and K. Wade; Organometallverbindungen; R. Runge). Preferably, use is made of solutions of magnesium dialkyls prepared according to the process described in the U.S. Pat. No. 3,737,393, which is incorporated by reference herein.

Suitable aluminum compounds are aluminum trialkyls and organo aluminum compounds having the general formula $(R_4)_2Al\ X$, where $R_4$ denotes an alkyl group having 1 to 20 carbon atoms and X denotes hydrogen or halogen. Aluminum compounds containing one or more substituent groups derived from a diene, as shown in German Auslegeschriften Nos. 1,956,353;

1,183,084; 1,136,113 and 1,186,633, may also be employed.

The chromium diketo compound, preferably the chromium (III) acetylacetonate, is reacted with an organo magnesium or organo aluminum compound in an inert solvent. Preferably, the inert solvent is a hydrocarbon solvent, particularly one or more aliphatic hydrocarbons, such as hexane or heptane, or a low boiling gasoline. Notwithstanding the fact that the chromium (III) acetyl acetonate dissolves more readily in aromatic hydrocarbons, than in aliphatic hydrocarbons, and can be reacted with magnesium diaryls that are soluble in aromatic hydrocarbons, there is a general inclination not to use aromatic hydrocarbon solvents because of their cost and in view of the fact that the preparation can be successfully conducted in aliphatic and/or cycloaliphatic solvents. Chromium (III) acetyl acetonate is only slightly soluble in aliphatic and/or cycloaliphatic hydrocarbons, and will be, at least in part, dispersed therein. However, upon addition of an organo magnesium or organo aluminum compound, the chromium (III) acetyl acetonate, will, at least partly, dissolve, probably with simultaneous formation of a complex compound of the organo magnesium or organo aluminum compound. Dissolution is promoted by gentle heating, e.g. at temperatures of 40°–100° C., or, if solvents of lower boiling point are used, at the boiling point of the respective solvent. In low boiling gasoline chromium (III) acetyl acetonate produces a weak violet coloration because it dissolves slightly in this medium. Reaction with the organo-magnesium or organo aluminum compound yields a dark-colored solution.

The atomic ratio Mg:Cr, or Al:Cr, in these solutions should range from 0.5:1 to 10:1, and preferably from 1:1 to 3:1. Said solution is subsequently combined with an inert inorganic support, for example, by adding the solution slowly and with simultaneous stirring to solvent containing a carrier dispersed therein. The chromium compound can be deposited on the support by evaporation, insofar as it does not deposit straight away from the solution onto the support. Deposition of the chromium compound on the support becomes apparent from the change in color of the solution as the chromium is transferred either completely or substantially to the support which becomes colored. The inert inorganic support is preferably an oxide, such as silica, alumina, mixed alumina-silica, or oxides of zirconium, thorium or magnesium. Silica, alumina and mixed silica-alumina are preferred, while silica is most preferred. Silica is available in many forms, all of which are suitable insofar as they will resist calcination. It has been found convenient to dry the support, e.g. by heating in dry air, before the complex chromium compound is deposited on it. Drying should preferably be undertaken to render the support free of physically bound water.

Amounts of the above-described complex chromium compound deposited on the support may vary, but will normally be in the range of 0.01–10% by wt. calculated as chromium metal on the support. Use of quantities outside of the aforementioned range is possible, but will not offer any advantages. Preferably the amount of complex chromium compound deposited on the support is sufficient to realize chromium metal content on the support of 0.02–2% by wt. of said support, and more preferably 0.05–1% by wt. chromium metal.

After the complex chromium compound and the support have been brought together in a solvent, support and chromium compound are separated from the solvent by evaporation or filtration. If the chromium compound fails to deposit on the support — in which case the solvent will retain all or substantially all of its original color — the solvent should be removed by evaporation.

The support containing the deposited chromium compound is subsequently heated at 200°–1200° C. in a nonreducing atmosphere, such as oxygen, air, nitrogen, carbon dioxide or a noble gas. Preferably, this heating step is undertaken in an oxidizing atmosphere as, for example, in the presence of oxygen or air; in this situation, obviously air with reduced or increased oxygen content can provide said oxidizing atmosphere. The supported chromium compound is preferably heated at 400°–1200° C., and most preferably at 500°–1100° C.

The aforementioned heating time may vary in duration from a few seconds to tens of hours or more. At temperatures in the range of 500°–1100° C. the heating time may generally be taken between 30 minutes and 6 hours. The optimum heating period may be determined experimentally by preparing catalysts of identical composition under otherwise identical circumstances, by varying the periods over which heating is carried out at a given temperature by determining the polymerization properties of the ultimate catalyst.

After being cooled to ambient temperature, the supported catalyst component is preferably dispersed in a hydrocarbon solvent, preferably a hydrocarbon solvent that is to be used as the polymerization medium. Examples of such solvents are aliphatic or cycloaliphatic hydro-carbons, such as butane, isobutane, normal or branched pentanes, hexanes, heptanes, octanes, etc.; cyclopentane, cyclohexane, cycloheptane, cyclooctane, etc., and mixtures thereof, notably fractions directly or indirectly recovered from mineral oil, such as low boiling gasoline, gasoline, kerosene, or gas oil, which may possible contain aromatics but predominantly consists of aliphatics and/or cycloaliphatics. From a technical view point, aromatic hydrocarbons like benzene, toluene, xylenes or halogenated hydrocarbons are also quite suitable, but on account of practical considerations such as cost and toxicity, it is usually preferred to use aliphatic hydrocarbons or mineral oil fractions.

These dispersions of the supported catalyst component can be stored for extended periods of time prior to treating the dispersion with an activator in accordance with the process of the invention for polymerizing 1-alkenes.

An organometal compound of an element of Group II or III of the Periodic system, as for example, beryllium, magnesium, boron, aluminum or gallium is added to carrier-supported-chromium compound to activate it. Said activating compounds are selected from organometallic compounds of elements of Group II or III of the periodic system, in which at least one hydrocarbon group e.g. alkyl of 1 to 20 carbon atoms is bonded through a carbon atom thereof to said element. The activating compound may be the same as the organometallic compound reacted with the chromium-diketo compound or may be different. The molar ratio of the organometal compound to supported chromium component may be varied over a wide range, e.g. between 0.1:1 and 200:1 based on the amount of chromium metal, preferably, between 5:1 and 40:1.

The polymerization of 1-alkenes with the catalysts according to the invention is preferably carried out in an inert solvent under such conditions that a suspension of the polymer in the solvent will result. When ethylene is polymerized, the polymerization will normally be executed at elevated temperatures, e.g. at 50° C. or higher and preferably at 70° C. or higher and normally at temperatures below 110° C., preferably below 100° C. and, more preferably not above 90° C. It was found that in highly volatile solvents the suspension polymerization can be carried out at 110° C. and even at somewhat higher temperatures. It is also possible to effect the polymerization at higher temperatures of e.g. 150°–200° C., giving a solution of the polyethylene in a solvent medium as e.g. low boiling gasoline.

The polymerization can also be carried out as a gas phase polymerization in accordance with art recognized conventional procedures. Propylene and higher olefins may also be polymerized in liquid monomer.

The polymerization can be carried out at atmospheric pressure, as well as at elevated pressures, the latter pressures being essential in those cases where low boiling solvents are employed, as for example butane, isobutane and pentane. Since polymerization under pressure results in higher yields, the pressure will normally be chosen in the elevated range, for example up to 100 kg/cm². Still higher pressures, up to say, 2000 kg/cm² can be employed, but are not usually employed on account of practical considerations. Preferably, the polymerization pressure is chosen between 6 and 80 kg/cm², and more preferably between 12 and 50 kg/cm².

Generally, and in most cases, the amount of catalyst employed is sufficient to insure that the chromium content in the polymerization medium is in the range between 0.001–10 mmoles per liter, preferably between 0.01–1 mmole/l. The polymer suspensions or solutions, produced in accordance with the polymerization process of the invention, may be worked up by known methods. The present polymerization lends itself to adaptations in accordance with conventional process techniques. For example, the molecular weight of the polymer products may be controlled by addition of hydrogen or other modifying agents conventionally used in alkene polymerizations for that purpose. The polymerization may be carried out in two or more parallel or series-arranged stages, in which different catalyst compositions, temperatures, residence times, pressures, hydrogen concentrations, etc., may be employed, if efficacious. For example, products of a wide molecular weight distribution can be prepared by using such conditions in the first stage of multistage process, so that a product of high molecular weight will be formed, and by so choosing the polymerization conditions in the second stage so that a product of relatively low molecular weight will be formed.

EXAMPLE 1

A. Catalyst Preparation

In a 1-liter flask fitted with a stirrer, a reflux cooler and an inlet tube, 1 gram of chromium (III) acetyl acetonate (2.87 moles) is suspended in 500 ml of dry low boiling gasoline (boiling range 65°–85° C.). This suspension is heated, with stirring, to the boiling point of the gasoline, whereupon 2.2 ml of a 3.91 molar (8.61 mmoles) triisobutyl aluminum (TIBA) is added to it dropwise. The resultant dark brownish-green solution contains only traces of solid material. After filtration, 210 ml of this solution is added dropwise to a suspension of 60 g of Aerosil 200 V in 900 ml of dry gasoline. The Aerosil 200 V has been pre-dried, i.e. heated at 120° C. for 16 hours. (Aerosil 200 V is a silicagel marketed by Degussa.)

After a short while, the dark solution changes in color, that is, the silica support becomes colored by deposition of the chromium compound on silica support. The silica-chromium compound product is now separated from the solvent by evaporation of the light gasoline, whereupon the resultant powder is heated at 50° C. in vacuo for 16 hours. After that, the powder is heated under a dry air stream of 900° C. in a rotary oven. Heat-up takes about 1 hour, whereupon the powder is kept at 900° C. for 1 hour. Next, the catalyst powder is cooled, and suspended in gasoline, the quantity of gasoline being so chosen that the suspension will contain 5 g of supported catalyst per 100 ml of gasoline. A fraction of the catalyst powder calcined at 900° C. is analyzed and appears to contain 0.12% wt of chromium and 0.20% wt of aluminum.

B. Polymerization of Ethylene 40 ml of catalyst suspension is added to 1500 ml of dry gasoline in a stirred 3.2-liter autoclave. Next 0.6 ml of a 1 M TIBA solution in gasoline is added, after which the reactor is closed and pressurized by introducing ethylene containing 5% of hydrogen. The autoclave is heated up to 85° C. and its contents polymerized for 1 hour at a total pressure of 4 atm.

The yield of polyethylene is 128 g, which corresponds to 1297 g of polyethylene per mmole of chromium per atmosphere ethylene pressure per hour. The melt index of the polyethylene as measured in accordance with ASTM D-1238 is 0.33.

EXAMPLES 2–20

A. Preparation of the Catalysts

In the manner described in Example 1, several catalysts were prepared in which the amount of chromium on the support was varied from that mentioned in Example 1A by varying the relation between the amount of chromium (III) acetyl acetonate and the amount of support. In Examples 3–17 the chromium (III) acetyl acetonate was treated with a magnesium dialkyl solution; the heating period and the heating temperature were varied, and various types of Aerosil were used.

The quantities and kinds of the compounds used, the quantities of chromium, aluminum or magnesium expressed in weight percent of the support, the heating time and temperatures, as well as the types of support and activators are set forth in Table 1.

B. Polymerizations

The polymerizations were carried out in a similar manner as described in Example 1B. In addition to the catalyst data, the Table sets forth the yield of polymer, the catalytic activity expressed in grams of polyethylene per mole of chromium per atmosphere ethylene pressure per hour, the melt index of the polyethylene and the composition of the gas in the reactor; in practically all these examples hydrogen was supplied in addition to the ethylene, while in Example 18 butylene was used as a comonomer in a concentration of 1%. From Example 8 it is seen that heating of the chromium (III) acetyl acetonate/ dibutyl magnesium complex on the support for 14 hours at 120° C. yields a catalyst possessing very little activity.

EXAMPLE 21

The catalyst was made in a similar manner as in Example 1; the data regarding quantities and the ultimate composition of the catalyst are disclosed in the Table. In this example, the polymerization was carried out as a gas phase polymerization over a period of 1.5 h at a temperature of approximately 70° C. The ethylene was led through a solution of triisobutyl aluminum. The pressure during the gas phase polymerization was 1 atmosphere.

| | catalyst properties | | | | | | activator R* | | | polymer | | | gas in reactor | | |
|---|---|---|---|---|---|---|---|---|---|---|---|---|---|---|---|
| example | Cr % wt | Al % wt | Mg % wt | heating time min. | heating temp. °C. | support | TiBA mmole/l | Mg OR' mmole/l | MgR$_2$* mmole/l | yield | activity g PE per mmole Cr per atm C$_2$ per h | melt index | % C$_2$ | % H$_2$ | % C$_4$ |
| 1 | 0.12 | 0.20 | — | 60 | 900 | Aerosil 200 V | 0.39 | — | — | 128 | 1297 | 0.33 | 95 | 5 | — |
| 2 | 0.24 | 0.23 | — | 60 | 900 | Aerosil 200 V | 0.27 | — | — | 192 | 973 | 0.3 | 95 | 5 | — |
| 3 | 0.17 | — | 0.37 | 60 | 900 | Aerosil 130 V | 0.53 | — | — | 226 | 1709 | 0.51 | 90 | 10 | — |
| 4 | 0.15 | — | 0.31 | 60 | 600 | Aerosil 130 V | 0.53 | — | — | 103 | 881 | 0.04 | 90 | 10 | — |
| 5 | 0.25 | — | 0.38 | 60 | 750 | Aerosil 130 V | 0.53 | — | — | 144 | 738 | 0.31 | 90 | 10 | — |
| 6 | 0.13 | — | 0.19 | 60 | 900 | Aerosil 220 V | 0.13 | — | 0.44 | 79 | 783 | 0.86 | 90 | 10 | — |
| 7 | 0.22 | — | 0.19 | 60 | 900 | Aerosil 220 V | 0.52 | — | — | 154 | 853 | 0.21 | 95 | 5 | — |
| 8 | 0.22 | — | 0.19 | 840 | 120 | Aerosil 220 V | 0.52 | — | — | 32 | 20 | | 95 | 5 | — |
| 9 | 0.25 | — | 0.21 | 60 | 900 | Aerosil 380 | 0.53 | — | — | 256 | 1316 | 0.74 | 90 | 10 | — |
| 10 | 0.25 | — | 0.21 | 60 | 900 | Aerosil 380 | — | 0.60 | — | 86 | 440 | 0.21 | 90 | 10 | — |
| 11 | 0.25 | — | 0.21 | 60 | 900 | Aerosil 380 | 0.53 | 0.60 | — | 106 | 544 | 0.37 | 90 | 10 | — |
| 12 | 0.10 | — | 0.22 | 60 | 900 | Aerosil 130 V | 0.53 | — | — | 138 | 1598 | 0.02 | 100 | — | — |
| 13 | 0.10 | — | 0.22 | 60 | 900 | Aerosil 130 V | 0.53 | — | — | 173 | 2222 | 1.16 | 90 | 10 | — |
| 14 | 0.10 | — | 0.22 | 60 | 900 | Aerosil 130 V | 0.53 | — | — | 78 | 1128 | 2.0 | 80 | 20 | — |
| *R = n-butyl | | | | | | | | | | | | | | | |
| R' = n-decyl | | | | | | | | | | | | | | | |
| 15 | 0.13 | — | 0.19 | 60 | 900 | Aerosil 220 V | 0.39 | — | — | 115 | 1131 | 0.77 | 90 | 10 | — |
| 16 | 0.13 | — | 0.19 | 60 | 900 | Aerosil 220 V | 0.53 | — | — | 139 | 1371 | 1.04 | 90 | 10 | — |
| 17 | 0.13 | — | 0.19 | 60 | 900 | Aerosil 220 V | 0.78 | — | — | 145 | 1433 | 1.29 | 90 | 10 | — |
| 18 | 0.12 | 0.20 | — | 60 | 900 | Aerosil 220 V | 0.39 | — | — | 121 | 1229 | 0.4 | 94 | 5 | 1** |
| 19 | 0.09 | | 0.19 | | | porous SiO$_2$ | 0.53 | — | — | 85 | 1211 | 0.47 | 90 | 10 | — |
| 20 | 0.11 | 0.19 | — | 360 | 900 | | 0.39 | — | — | 90.4 | 1000 | 0.48 | 95 | 5 | — |
| 21* | 0.12 | 0.20 | — | 60 | 900 | Aerosil 200 V | * | — | — | 15.6 | 230 | | 100 | — | — |

*Gasphase polymerization; temp. 70°C.; 1.5 h, C$_2$ led through TiBA, pressure 1 at.
**see text Thus it is apparent that there has been provided, in accordance with the invention a catalyst, as well as a method for its preparation and use, that fully satisfied the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

What is claimed is:

1. A process for the polymerization of at least one 1-alkene containing from 2 to 8 carbon atoms, with from 0 to 10 mole% of at least one other 1-alkene containing from 2 to 8 carbon atoms, in the presence of a catalyst essentially composed of (1) a supported chromium compound and (2) an organometal compound of an element of Group II or III of the periodic system, wherein said catalyst has been prepared by
    (a) contacting in an inert solvent medium
        (1) a chromium complex of a 1,3-diketo compound of the formula

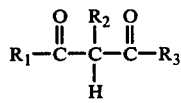

wherein each of $R_1$ and $R_3$ represents an alkyl group of from 1 to 10 carbon atoms and $R_2$ represents hydrogen or an alkyl group of from 1 to 10 carbon atoms,
    with
        (2) an organometallic compound of a metal of Group II or III of the periodic system, in which said metal is bonded to at least one hydrocarbyl group containing from 1 to 20 carbon atoms through a carbon atom thereof;
    (b) subsequently depositing the reaction products of step (a) on an inert inorganic support;
    (c) heating the thus-deposited reaction product of step (b) on said support in a non-reducing atmosphere at a temperature between about 200° and 1200° C.; and
    (d) subsequently adding an activating amount of an organometallic compound of a metal of Group II or III of the periodic system to the product resulting from step (c).

2. Process according to claim 1, wherein in step (a) said chromium complex is used in an amount of one mole per 0.5-10 moles of said organometallic compound, based on moles of chromium metal.

3. Process according to claim 2, wherein in step (a) from 1 to 3 moles of said organometallic compound are used per mole of said chromium metal complex.

4. Process according to claim 1, wherein in step (a) said organometallic complex is an aluminum trialkyl.

5. Process according to claim 1, wherein in step (a) a magnesium dialkyl is used as said organometallic compound.

6. Process according to claim 5, wherein in step (a) said magnesium dialkyl is dissolved in a hydrocarbon.

7. Process according to claim 1, wherein in step (a) said complex is chromic acetyl acetonate and said organometallic compound is aluminum trialkyl.

8. Process according to claim 1, wherein in step (a) said organometallic complex is a dialkyl aluminum hydride or a dialkyl aluminum halide.

9. Process according to claim 1, wherein said inert inorganic support is either alumina, silica or a mixture of alumina and silica.

10. Process according to claim 1, wherein in step (c) said heating is conducted in an oxygen-containing atmosphere.

11. Process according to claim 1, wherein in step (c) said heating is at a temperature of from about 400° to 1200° C.

12. Process according to claim 11, wherein said heating is at a temperature from 500° to 1100° C.

13. Process according to claim 12, wherein said heating is carried out from about 30 minutes to about 6 hours.

14. Process according to claim 1, wherein from about 0.01 to 10% by weight of said chromium complex, calculated as chromium metal, is deposited on said support.

15. Process according to claim 14, wherein from 0.02 to 2% by weight of said chromium complex, calculated as chromium, is deposited on said support.

16. Process according to claim 15, wherein from 0.05 to 1% by weight of chromium complex, calculated as chromium, is deposited on said support.

17. Process according to claim 1, wherein the molar ratio between the said organometallic compound used in step (d) and the deposited, heated and supported chromium complex, calculated as chromium, is between about 0.1:1 to 200:1.

18. The process for forming a supported chromium catalyst component for the polymerization of 1-alkenes, comprising (a) contacting in an inert solvent medium (1) a chromium complex of a 1,3-diketo compound of the formula

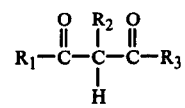

wherein each of $R_1$ and $R_3$ represents an alkyl group of 1 to 10 carbon atoms and $R_2$ is hydrogen or alkyl of 1 to 10 carbon atoms, with (2) an organometallic compound of a metal of Group II or III of the periodic system, in which said metal is bonded to at least one hydrocarbyl group containing from 1 to 20 carbon atoms through a carbon atom thereof;

(b) depositing the reaction product of step (a) on an inert inorganic support; and (c) heating the thus-deposited reaction product of step (b) on said support in a non-reducing atmosphere at a temperature of between about 200° and 1200° C.

19. The product produced by the process of claim 18.

20. The process for forming a supported chromium catalyst for the polymerization of 1-alkenes, wherein the chromium catalyst component produced by the process of claim 18 is combined with an organometallic compound of a metal of Group II or III of the periodic system.

21. The product produced by the process of claim 20.

* * * * *